(12) United States Patent
Zhang et al.

(10) Patent No.: US 12,222,817 B2
(45) Date of Patent: Feb. 11, 2025

(54) METHOD, ELECTRONIC DEVICE, AND COMPUTER PROGRAM PRODUCT FOR BACKING UP DATA

(71) Applicant: Dell Products L.P., Round Rock, TX (US)

(72) Inventors: Weibing Zhang, Beijing (CN); Victor Lei Gao, Beijing (CN); Henry Hao Fang, Beijing (CN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/477,260

(22) Filed: Sep. 28, 2023

(65) Prior Publication Data

US 2025/0013538 A1     Jan. 9, 2025

(30) Foreign Application Priority Data

Jul. 7, 2023   (CN) .......................... 202310836638.8

(51) Int. Cl.
  *G06F 16/245*   (2019.01)
  *G06F 11/14*    (2006.01)
(52) U.S. Cl.
  CPC ...... *G06F 11/1453* (2013.01); *G06F 2201/84* (2013.01)

(58) Field of Classification Search
  CPC .................................................... G06F 16/245
  See application file for complete search history.

(56) References Cited

U.S. PATENT DOCUMENTS

| | | | |
|---|---|---|---|
| 7,921,328 B1 * | 4/2011 | Gulati | G06F 11/2074 714/15 |
| 8,479,852 B2 * | 7/2013 | Maurer | F28F 13/06 165/41 |
| 9,245,558 B1 * | 1/2016 | Boyle | G05B 15/02 |

* cited by examiner

*Primary Examiner* — Baoquoc N To
(74) *Attorney, Agent, or Firm* — Amin, Turocy & Watson, LLP (57) ABSTRACT

Backing up data is described. An example method includes acquiring data block deduplication information of source data and pieces of backup node deduplication information of backup nodes in a backup node set. Then, based on the data block deduplication information and the pieces, deduplication rates of the source data are determined relative to the backup nodes in the backup node set. In addition, based on the deduplication rates for the plurality of backup nodes, a target backup node is selected for backing up the source data from the backup node set. Data features of the to-be-backed-up source data are utilized to determine the deduplication rate of the source data relative to each backup node, thereby selecting the target backup node through the deduplication rates of the backup nodes. The space occupation of backup nodes can also be reduced when backing up the source data, thereby achieving better space utilization.

20 Claims, 7 Drawing Sheets

METHOD, ELECTRONIC DEVICE, AND COMPUTER PROGRAM PRODUCT FOR BACKING UP DATA

RELATED APPLICATION

The present application claims the benefit of priority to Chinese Patent Application No. 202310836638.8, filed on Jul. 7, 2023, which application is hereby incorporated into the present application by reference herein in its entirety.

TECHNICAL FIELD

Embodiments of the present disclosure generally relate to the technical field of computers, and more specifically to a method, an electronic device, and a computer program product for backing up data.

BACKGROUND

Data backup is an important method for protecting data integrity and recoverability. When source data on a storage device in a storage system is very important, a user may configure a backup service for the important data to ensure that the data can be restored even if the storage device is damaged. Moreover, through data backup, the protected data can also be restored to a specified time node to view the corresponding data.

When backing up data, a plurality of factors often is considered, such as backup speed, backup space, and number of backups, among which the backup space is crucial. By selecting an appropriate backup node for the to-be-backed-up source data, it can save the backup space and thereby reduce storage costs.

SUMMARY

Embodiments of the present disclosure provide a method, an electronic device, and a computer program product for backing up data.

The embodiments of the present disclosure provide a method, an electronic device, and a computer program product for backing up data. The method includes acquiring data block deduplication information of source data and a plurality of pieces of backup node deduplication information of a plurality of backup nodes in a backup node set, wherein backup node deduplication information in the plurality of pieces of backup node deduplication information includes data block deduplication information of backed up data in a corresponding backup node. The method further includes determining, based on the data block deduplication information of the source data and the plurality of pieces of backup node deduplication information, a plurality of deduplication rates of the source data relative to the plurality of backup nodes in the backup node set, wherein a deduplication rate in the plurality of deduplication rates indicates a deduplication ratio of the source data when backing up the source data to the corresponding backup node. Moreover, the method further includes selecting, based on the plurality of deduplication rates for the plurality of backup nodes, a target backup node for backing up the source data from the backup node set.

In another embodiment of the present disclosure, an electronic device is provided. The device includes a processing unit and a memory, wherein the memory is coupled to the processing unit and stores instructions. The instructions, when executed by the processing unit, perform the following actions: acquiring data block deduplication information of source data and a plurality of pieces of backup node deduplication information of a plurality of backup nodes in a backup node set, wherein backup node deduplication information in the plurality of pieces of backup node deduplication information includes data block deduplication information of backed up data in a corresponding backup node; determining, based on the data block deduplication information of the source data and the plurality of pieces of backup node deduplication information, a plurality of deduplication rates of the source data relative to the plurality of backup nodes in the backup node set, wherein a deduplication rate in the plurality of deduplication rates indicates a deduplication ratio of the source data when backing up the source data to the corresponding backup node; and selecting, based on the plurality of deduplication rates for the plurality of backup nodes, a target backup node for backing up the source data from the backup node set.

In still another embodiment of the present disclosure, a computer program product is provided. The computer program product is tangibly stored on a non-transitory computer-readable storage medium and includes computer-executable instructions, the computer-executable instruction, when executed, causing a computer to perform the method or process according to the embodiments of the present disclosure.

This Summary part is provided to introduce relevant concepts in a simplified manner, which will be further described in the Detailed Description below. This Summary part is neither intended to identify key features or essential features of the present disclosure, nor intended to limit the scope of the embodiments of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same elements.

DETAILED DESCRIPTION

Preferred embodiments of the present disclosure will be described in more detail below with reference to the accompanying drawings. While some specific embodiments of the present disclosure are shown in the accompanying drawings, it should be understood that the present disclosure may be implemented in various forms, and should not be limited to the embodiments set forth herein. Rather, these embodiments are provided to make the present disclosure more thorough and complete and to fully convey the scope of the present disclosure to those skilled in the art.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects, unless otherwise specifically indicated.

Data backup is an important method of protecting data in a storage system. When performing data backup, for to-be-backed-up source data, a target backup node is selected from a plurality of backup nodes in a backup node set, for backing up the to-be-backed-up source data. When selecting a backup node for the to-be-backed-up source data, existing data backup methods often rely on remaining space of backup nodes or simply performs determination according to a compression rate and a deduplication rate of the source data, resulting in a failure in achieving optimal space utilization. This is because when backing up the source data, the source data may be divided into a plurality of data blocks, and some of these data blocks may already exist on the backup node. Therefore, it is unnecessary to actually store these data blocks during backup, which can thus save space. Therefore, when the data blocks of the source data are not on the selected backup node, it will result in a low space utilization.

To address the above issues, the embodiments of the present disclosure provide a method for backing up data. The method selects an appropriate backup node by utilizing a data feature of the to-be-backed-up source data. Specifically, data block deduplication information of the source data is acquired, the data block deduplication information recording the number of occurrences of each data block in the source data, and by comparing the data block deduplication information of the source data with data block deduplication information of a plurality of backed up data blocks on the backup node, a deduplication rate of the source data relative to each backup node is determined, thereby selecting a target backup node through a plurality of deduplication rates of a plurality of backup nodes. By analyzing the data feature of the to-be-backed-up source data, the embodiments of the present disclosure can reduce the space occupation of backup nodes and achieve better space utilization when backing up the source data.

Figure 1:
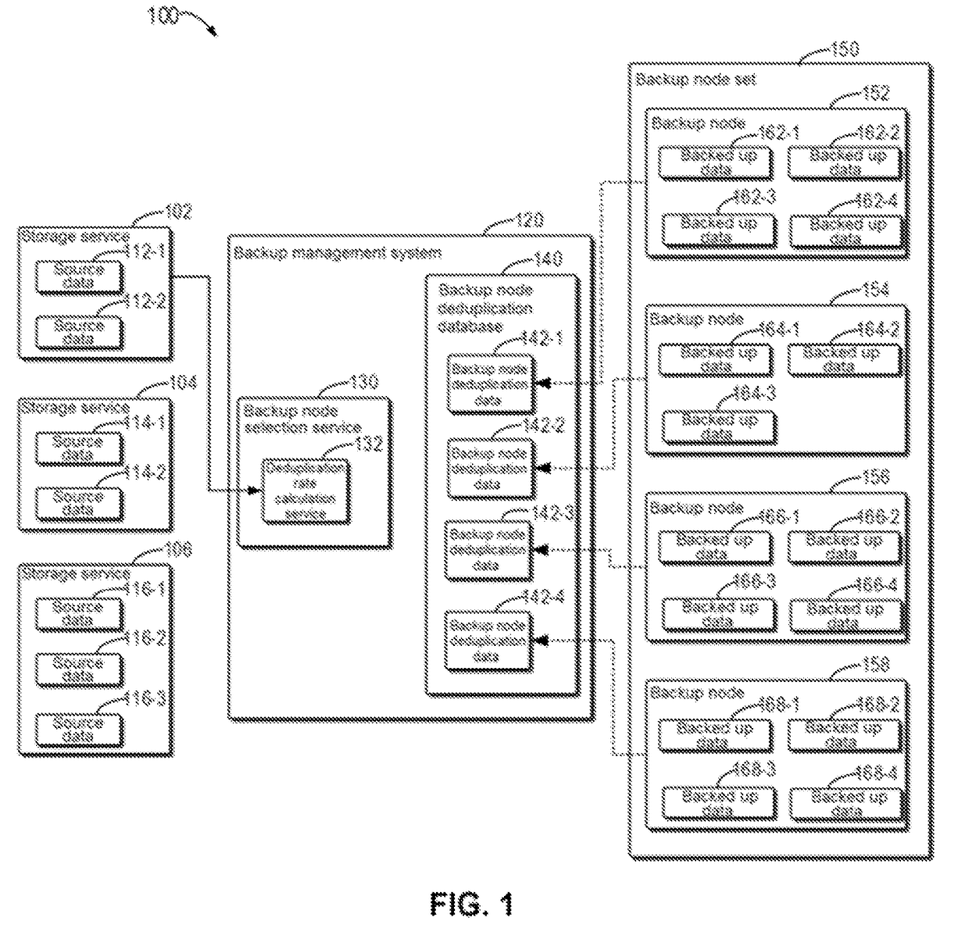
FIG. 1 is a schematic diagram of an example environment in which an embodiment of the present disclosure can be implemented.

FIG. 1 is a schematic diagram of an example environment 100 in which an embodiment of the present disclosure can be implemented. As shown in FIG. 1, an example environment 100 includes a storage service 102, a storage service 104, and a storage service 106. These storage services may be the same storage service or different storage services, such as different storage services from the same supplier. It should be understood that only 3 storage services are illustrated in the example environment 100, but in fact there may be fewer or more storage services.

Each storage service stores some source data, and each piece of source data belongs to a specific tenant. For example, the storage service 102 stores source data 112-1 and 112-2, the storage service 104 stores source data 114-1 and 114-2, and the storage service 106 stores source data 116-1, 116-2, and 116-3. It should be understood that the number of pieces of source data stored on each storage service here is only for example purposes, and in fact, fewer or more pieces of source data may be stored. In some embodiments, each piece of source data may be stored on different storage devices. For example, the source data 112-1 may be stored in a flash memory, a hard drive, and a file system.

In addition, the example environment 100 further includes a backup management system 120, and enables the selection of a suitable backup node for any source data in the source data through the backup management system 120, in order to save the space of backup nodes to the maximum extent. As shown in FIG. 1, the backup management system 120 includes a backup node selection service 130, which selects a target backup node based on the deduplication rate of the to-be-backed-up source data relative to each backup node through a deduplication rate calculation service 132. For example, when the source data 112-1 is the to-be-backed-up source data, the backup management system 120 may obtain data block deduplication information of the source data 112-1, which includes key value pairs of data blocks in the source data 112-1 and the number of occurrences of the data blocks. Then, a plurality of deduplication rates may be calculated through the deduplication rate calculation service 132 in the backup node selection service 130. The data block deduplication information of the source data 112-1 may be pre-calculated or calculated at the time of initiating a backup request, which is not limited in the present disclosure. In addition, when the data block deduplication information is pre-calculated, it may be stored on the storage device where the source data 112-1 is located or on the backup management system 120, which is not limited in the present disclosure.

In addition, the example environment 100 further includes a backup node set 150, which includes backup nodes 152 to 158. When calculating a plurality of deduplication rates, backup node deduplication data 142-1 to 142-N is obtained from a backup node deduplication database 140. For example, the backup node deduplication data 142-1 is deduplication data of the backup node 152, which includes data block deduplication information of each piece of backed up data in backed up data 162-1 to 162-4. It should be understood that the data block deduplication information of the backed up data and the data block deduplication information of the source data are the same in terms of data structure. In addition, the backup node deduplication data 142-2 is deduplication data of the backup node 154, which includes data block deduplication information of each piece of backed up data in backed up data 164-1 to 162-3. Node deduplication data 142-3 is deduplication data of the backup node 156, which includes data block deduplication information of each piece of backed up data in backed up data 166-1 to 166-4. The backup node deduplication data 142-4 is deduplication data of the backup node 158, which includes data block deduplication information of each piece of backed up data in backed up data 168-1 to 162-8. It should be understood that the number of backup nodes here and the number of backed up nodes in each backup node are exemplary, and smaller or larger numbers may be included.

It should be understood that describing the architecture and functionality in the example environment 100 is for illustrative purposes only and does not imply any limitations to the scope of the present disclosure. The embodiments of the present disclosures may also be applied to other environments with different structures and/or functions.

Figure 2:
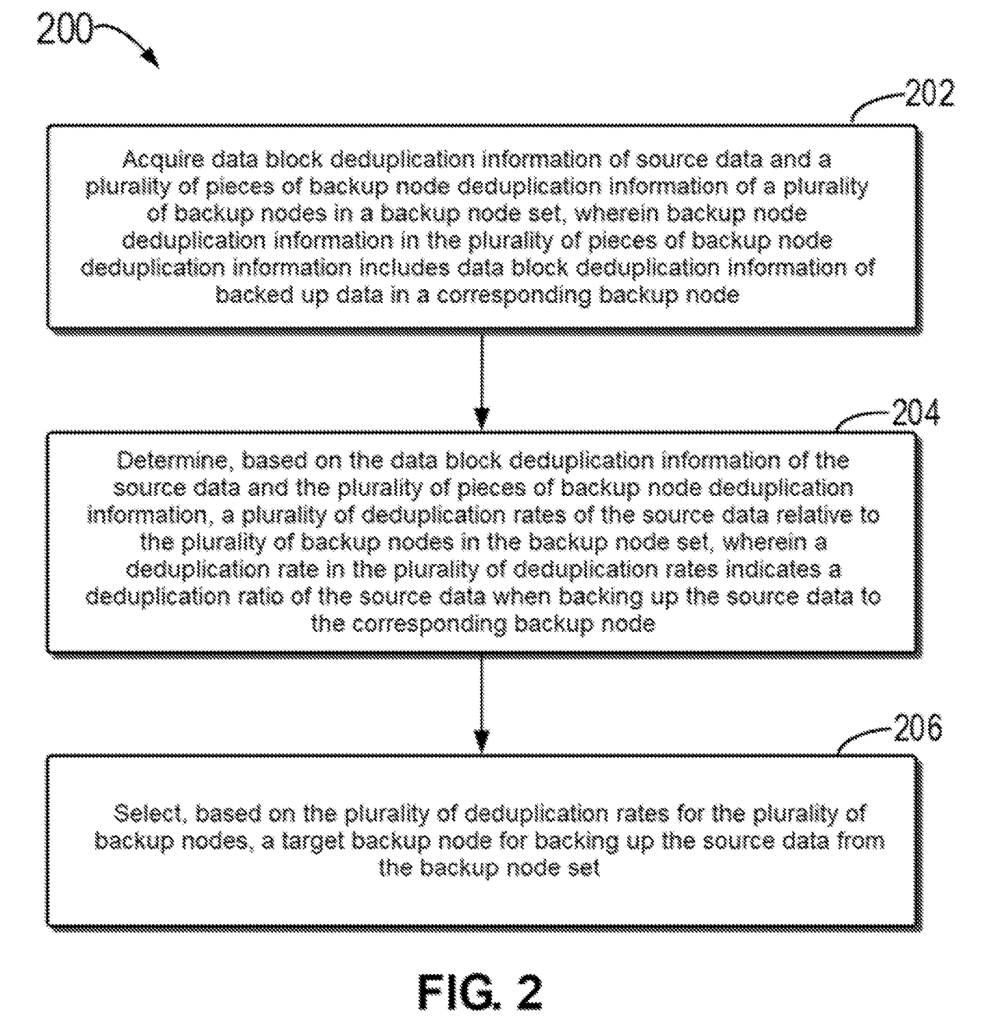
FIG. 2 is a flow chart of a method for backing up data according to some embodiments of the present disclosure.

FIG. 2 is a flow chart of a method 200 for backing up data according to some embodiments of the present disclosure. At 202, data block deduplication information of source data and a plurality of pieces of backup node deduplication information of a plurality of backup nodes in a backup node set are acquired. Backup node deduplication information in the plurality of pieces of backup node deduplication information includes data block deduplication information of backed up data in a backup node. For example, when backing up the source data to a backup node, the source data is divided into a plurality of data blocks and stored in the form of data blocks on the backup node. When the source data is divided into a plurality of data blocks, because of the duplication of the source data itself, there will be duplication between data blocks. By deduplicating the data blocks and counting the number of occurrences of each deduplicated data block, data block deduplication information of the source data may be obtained. In addition, the deduplication information of the backup node may be obtained with reference to FIG. 1. For example, the backup node deduplication data 142-1 of the backup node 152 includes data block deduplication information of each piece of the backed up data 162-1 to 162-4. For example, when the backed up data 162-4 is backed up to the backup node 152, its data block deduplication information is also recorded in the backup node deduplication data 142 of the backup node 152.

At 204, a plurality of deduplication rates of the source data relative to the plurality of backup nodes in the backup node set is determined based on the data block deduplication information of the source data and the plurality of pieces of backup node deduplication information, wherein a deduplication rate in the plurality of deduplication rates indicates a deduplication ratio of the source data when backing up the source data to the corresponding backup node. For example, referring to FIG. 1, when backing up the source data 112-1, the deduplication rates of the source data 112-1 relative to the backup nodes 152 to 158 may be calculated based on the data block deduplication information of the source data 112-1 and the backup node deduplication data 142-1 to 142-4. In other words, when backing up the source data 112-1 to each backup node, a deduplication ratio for duplicate data blocks may be calculated. Correspondingly, a larger deduplication ratio indicates more storage space saved on the backup node, and it can promote the efficiency of the backup process.

At 206, based on the plurality of deduplication rates for the plurality of backup nodes, a target backup node is selected for backing up the source data from the backup node set. For example, referring to FIG. 1, when backing up the source data 112-1, 4 deduplication rates of the source data 112-1 relative to the backup nodes 152 to 158 are calculated, and the backup node with the highest deduplication rate is selected as a target backup node of the source data 112-1, which can save storage space for the entire backup node set and optimize the backup service.

Therefore, the method 200 according to some embodiments of the present disclosure calculates the deduplication rate of the source data relative to each backup node by utilizing the data feature of the source data, thereby selecting an appropriate backup node for the source data. Therefore, the backup node with the highest deduplication rate may be selected for the source data, thereby optimizing the space occupation of the backup node and improving the efficiency of the backup process.

Figure 3A:
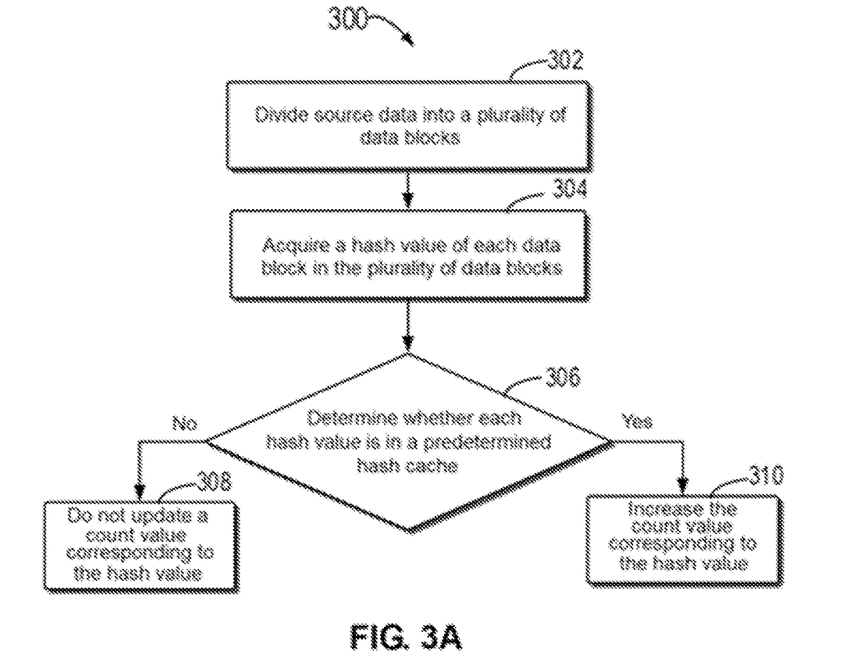
FIG. 3A is a flow chart of a process of acquiring data block deduplication information of source data according to some embodiments of the present disclosure.

FIG. 3A is a flow chart of a process 300 of acquiring data block deduplication information of source data according to some embodiments of the present disclosure. At 302, the source data is divided into a plurality of data blocks, and each data block may have a fixed size, such as 8 KB. For example, the plurality of data blocks of the source data may be $b_1$, $b_2$ ... by. At 304, a hash value of each data block in the plurality of data blocks is acquired. For example, when calculating the hash value of each data block, various commonly used hash algorithms such as the SHA2 algorithm may be used to obtain the hash value of the data block. After the hash value of the data block is obtained, it may be determined whether corresponding data blocks are the same by comparing the hash values. For example, it may be difficult to directly compare whether $b_1$ and $b_2$ are the same data block. However, after a hash value $h_1$ of $b_1$ and a hash value $h_2$ of $b_2$ are obtained, the hash values $h_1$ and $h_2$ may be directly compared to determine whether the data blocks $b_1$ and $b_2$ are the same.

At 306, it is determined whether the hash value of each data block is in a predetermined hash cache, and the predetermined hash cache here is a set of hashes with a high probability of duplication maintained in the storage system. How to maintain the hash cache will be described below with reference to FIG. 3B. When it is determined that the hash value is not in the predetermined hash cache, at 308, a count value of the hash value is not updated, that is, the count value corresponding to the hash is always 0. When it is determined that the hash value is in the predetermined hash cache, at 310, a count value corresponding to the hash value is increased, such as adding 1 to the count value. For example, the hash value $h_1$ of the data block $b_1$ is not in the predetermined hash cache, and then a count value corresponding to the hash value $h_1$ is not updated and is always 0. The hash value $h_2$ corresponding to the data block $b_2$ is in the predetermined hash cache, and then the count of the hash value $h_2$ is increased by 1. It should be understood that there may be another data block $b_m$ whose hash value is also $h_2$ (that is, the data block $b_m$ and the data block $b_2$ are the same data block), so the count value of the hash value $h_2$ may further be increased by 1. Finally, the data block deduplication information obtained for the source data is $C=\{(h_0, c_0), (h_1, c_1), \ldots (h_n, c_n)\}$, for example $h_0$ is a hash value of a certain data block in the source data, and the hash value is in the predetermined hash cache; $c_0$ is the number of times the hash value $h_0$ appears in the source data, that is, the number of times the data block corresponding to the hash value $h_0$ appears in a plurality of pieces of data of the source data.

Therefore, when obtaining the data block deduplication information of the source data, the process 300 according to some embodiments of the present disclosure utilizes the predetermined hash cache, and the predetermined hash cache is a set of hashes with a high probability of duplication maintained in the storage system. For example, the source data may have a large number of different hash values, and therefore, the data block deduplication information may be highly redundant, in which many hash values may not be duplicated with the data blocks on the backup node in subsequent backups. Through the predetermined hash cache. Therefore, the acquired data block deduplication information only maintains hash values and their count values that may have a high probability of duplication during backup, thereby optimizing the data block deduplication information.

Figure 3B:
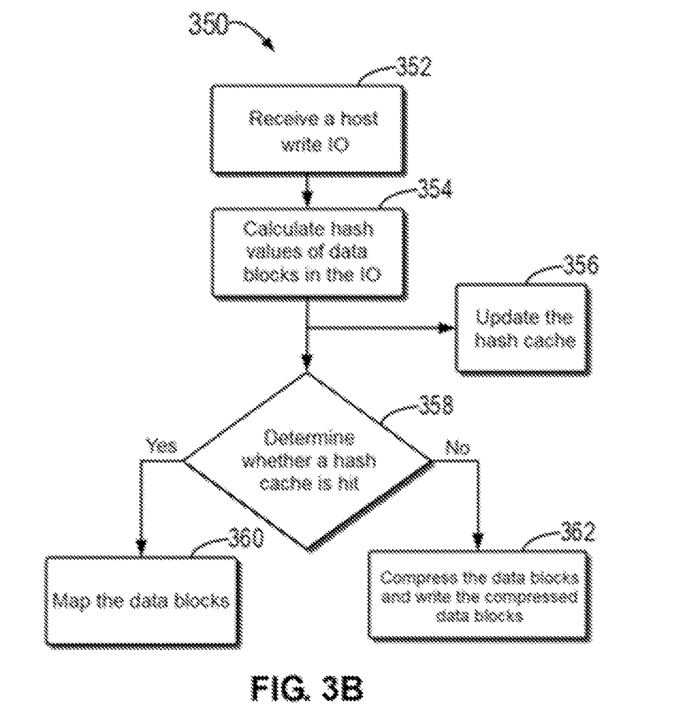
FIG. 3B is a schematic diagram of a process of maintaining a hash cache according to some embodiments of the present disclosure.

FIG. 3B is a schematic diagram of a process 350 of maintaining a hash cache according to some embodiments of the present disclosure. For a primary storage server, deduplication services are usually enabled. Deduplication can reduce the amount of storage used for user data by retaining only a small number of copies (usually only one copy) of data blocks with a given content. The deduplication may be completed in real time when data enters the storage device, known as In-line Deduplication. The in-line deduplication not only can save space, but also can provide additional performance improvement. On the storage system, there is a large amount of write IO, and the in-line deduplication technology may be used to store the corresponding data blocks on the storage device. At 352, a host write IO is received. At 354, hash values of data blocks in the IO are calculated, wherein various hash algorithms, such as an SHA512 (truncating the first 256 bits of 256 bits) encryption hash function, may be used to calculate the hash values. At 356, the hash values are used for updating the hash cache. For example, when a specific hash value does not exist in the hash cache, the specific hash value is written to the hash cache, or when a specific hash value already exists in the hash cache, a count value corresponding to the hash cache is increased by 1. The subsequent steps are routine operations of the write IO, such as determining whether the hash value is in the predetermined cache at 358. If it hits, the data blocks are only mapped at 360 instead of being actually written. If it is missed, the data blocks are compressed and written at 362.

Therefore, the hash cache stores hash values and their count values of a large number of data blocks on the storage system. Duplication levels of the hash values may be determined by absolute sizes or relative rankings of the count values, which also indicate the possibility of hash value deduplication. In some embodiments, top hash values with large absolute sizes or relative rankings are selected as the predetermined hash cache used in the process 300 described in FIG. 3A to obtain the data block deduplication information of the source data. It should be understood that the top hash values with large absolute size or relative rankings mentioned here are not a limitation. Those skilled in the art can select more or fewer hash values as needed.

Figure 4:
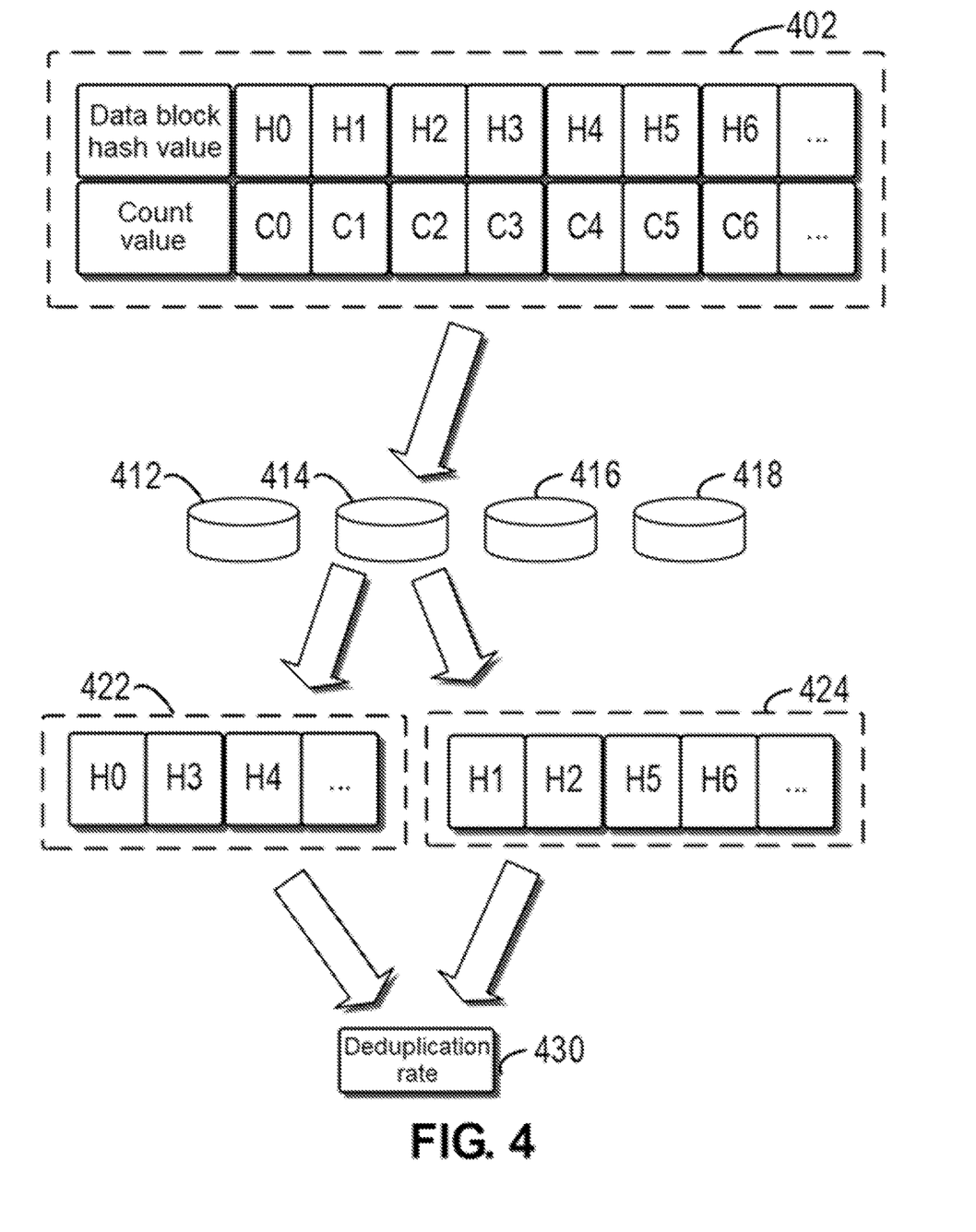
FIG. 4 is a schematic diagram of a process of calculating a deduplication rate according to some embodiments of the present disclosure.

FIG. 4 is a schematic diagram of a process 400 of calculating a deduplication rate according to some embodiments of the present disclosure. As shown in FIG. 4, a block 402 is data block deduplication information of to-be-backed-up source data, and the data block deduplication information includes data block hash values of the source data and corresponding count values thereof. For example, the data block deduplication information 402 includes the hash values H0 to H6 of the source data, and corresponding count values are C0 to C6, respectively.

In addition, FIG. 4 includes backup nodes 412 to 416, and during backup, a deduplication rate of the source data is calculated relative to each backup node. Taking the calculation of a deduplication rate 430 of the source data relative to the backup node 414 (that is, equivalent to the backup node 154 in FIG. 1) as an example, the deduplication node 414 includes a plurality of pieces of backed up data (that is, equivalent to the plurality of pieces of backed up data 164-1 to 161-3 in FIG. 1), and each piece of backed up data has data block deduplication information, which is in the same form as that of the data block deduplication information 402 of the source data. By using the data block deduplication information of the backed up data of the backup node 414, a stored hash set of the backup node 414 may be obtained to determine whether each hash value in the data block deduplication information 402 is on the backup node 414.

As shown in FIG. 4, the hash value H0 is in the stored hash set of the backup node 414, and therefore the hash value H0 is added to a hit set 422. The hash value H1 is not in the stored hash set of the backup node 414, and therefore the hash value H1 is added to a missed set 424. When calculating the deduplication rate 430, deduplication values, namely C0+C3+C4+ . . . , corresponding to the hash values in the missed set 422 may be determined, and deduplication values (C1-1)+ (C2-1)+ (C5-1)+ (C6-1) . . . corresponding to the hash values in the missed set 422 may be determined. Here, the data block corresponding to the hash value H1 is not on the backup node 414, so the data block needs to be written to the backup node 414 only once, and therefore, its corresponding deduplication value is (C1-1), and other parts also have the same meaning. More generally, the deduplication rate $R_i$ may be calculated as shown in Formula 1:

$$R_i = \frac{\left(\sum_{j=0}^{u} x_j + \sum_{k=0}^{w}(y_k - 1)\right) * \text{Block\_Size}}{\text{Total\_Primary\_Data\_Size}} \quad (1)$$

wherein $x_j$ is the count value of the hash value in the hit set 422 (that is, the count value of the hash value in the data block deduplication information of the source data), $y_k$ is the count value of the hash value in the missed set 424, Block_Size represents the size of the data block (for example, 8 KB), and Total_Primary_Data_Size represents the size of the source data.

Figure 5:
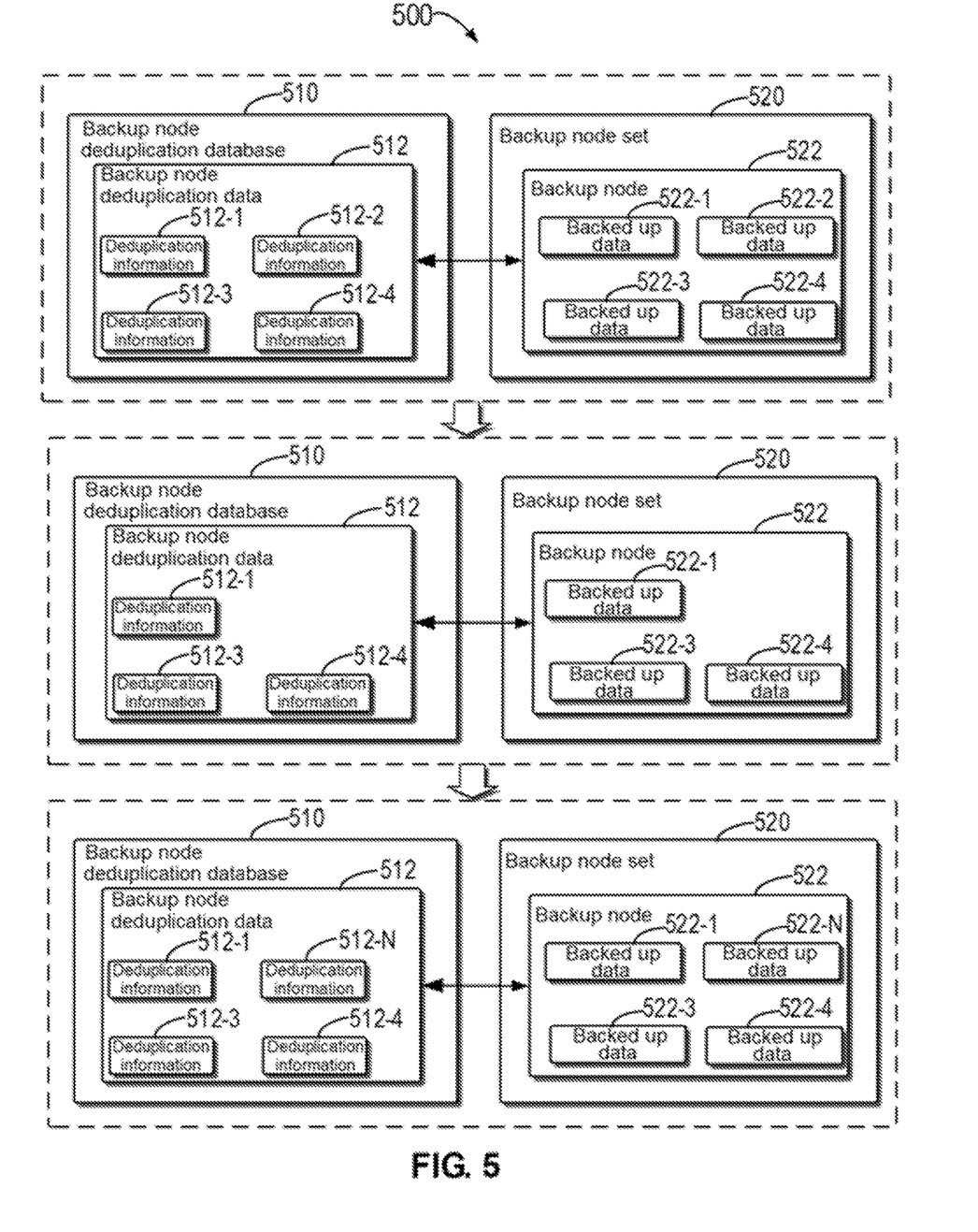
FIG. 5 is a schematic diagram of a process of maintaining backup node deduplication data of a backup node according to some embodiments of the present disclosure.

FIG. 5 is a schematic diagram of a process 500 of maintaining backup node duplication data of a backup node according to some embodiments of the present disclosure. As shown in FIG. 5, a backup node deduplication database 510 and a backup node set 520 are included. For illustrative purposes, the backup node deduplication database 510 only shows backup node deduplication data 512, and the backup node set 520 only shows a backup node 522. At the beginning, the backup node 522 includes backed up data 522-1 to 522-4, and data block deduplication information corresponding to each piece of backed up data is stored in the backup node deduplication data 512, that is, deduplication information 512-1 to 512-4. At a certain moment, the backed up data 522-2 in the backup node 522 is removed, and then its corresponding deduplication information 512-2 also needs to be removed in the backup node deduplication data 512. At another moment, new backup data, that is, backed up data 525-N, is added to the backup node 522, and then its corresponding deduplication information 512-N may also be added to the backup node deduplication data 512.

Figure 6:
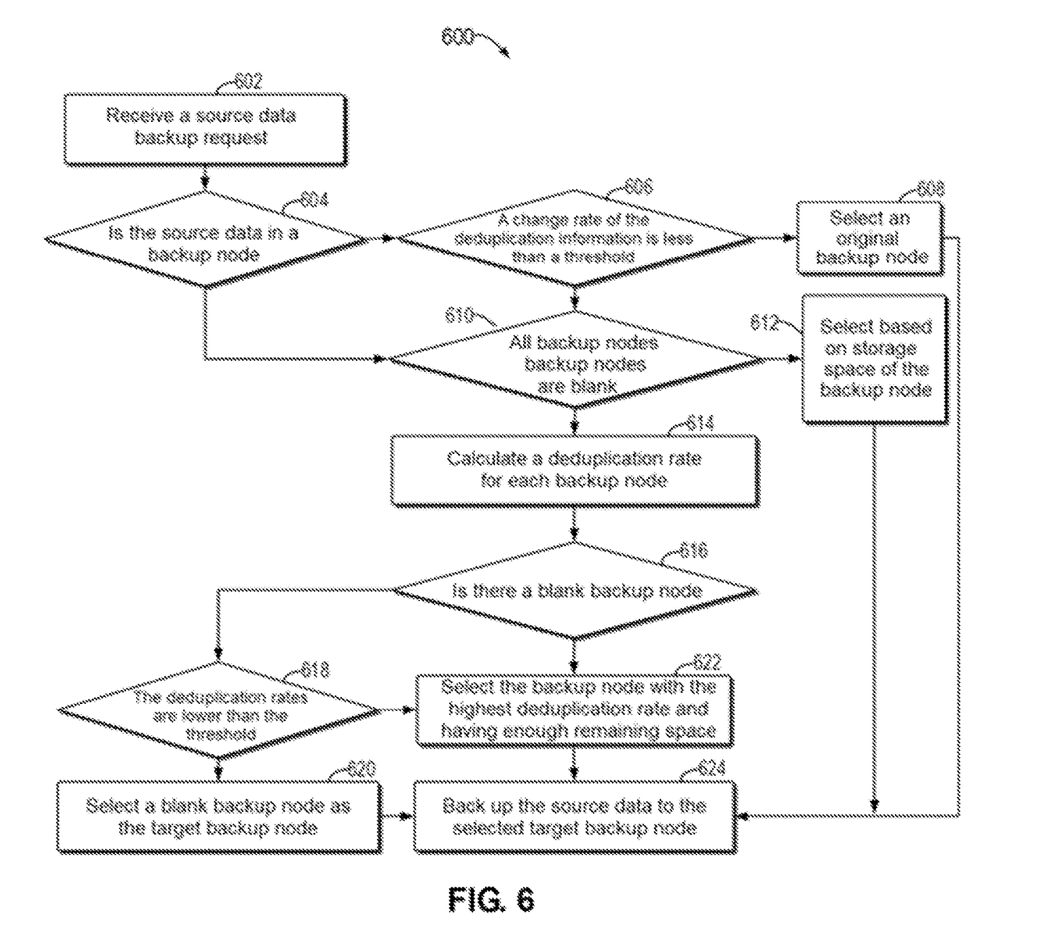
FIG. 6 is a flow chart of a method for backing up data according to some embodiments of the present disclosure.

FIG. 6 is a flow chart of a method 600 for backing up data according to some embodiments of the present disclosure. At 602, a source data backup request is received. At 604, it is determined whether the source data is in a backup database. In addition, it may also be determined whether data block deduplication information of the source data is in a backup data deduplication database. Because the source data may have been backed up to a backup node at a previous moment, it is a good choice to directly back up the source data to the previous backup node when there is little change in the source data between the current moment and the previous moment. Therefore, a determination is performed at 604 to determine whether the source data is in the database. When it is determined at 604 that the source data is in the backup node, that is, the source data is backed up not for the first time, the process proceeds to 606 to determine whether a change rate of the deduplication information of the source data is less than a predetermined threshold. The reason for performing the determination is that when the source data is backed up not for the first time, but the source data has a significant change compared with the previous backup, it is still appropriate to select a suitable backup node for the source data. When the change is not significant, the source data is directly backed up to the original backup node, which can achieve the maximum deduplication rate. When it is determined at 606 that the change rate of the deduplication information of the source data is less than the predetermined threshold, the process proceeds to 608 to select the original backup node for this backup.

When it is determined at 604 that the source data is not in the backup node, that is, the source data is backed up for the first time, the process proceeds to 610. When it is determined at 606 that the change rate of the deduplication information of the source data is greater than the predetermined threshold, that is, the change rate of the source data compared with the previous backup is large, the process also proceeds to 610. At 610, it is determined whether all backup nodes are blank backup nodes. When it is determined at 610 that all backup nodes are blank backup nodes, the process proceeds to 612 to select the backup node based on remaining storage space of the backup node. When all backup nodes have the same remaining storage space, a backup node may be randomly selected as the target backup node. Since all backup nodes are blank backup nodes, it is easy to understand that when the source data is backed up to any backup node, the deduplication rate is the same.

When it is determined at 610 that not all backup nodes are blank backup nodes, the process proceeds to 614. At 614, a deduplication rate of the source data relative to each backup node is calculated. At 616, it is determined whether there is a blank backup node. When there is a blank backup node, the deduplication rate of the source data relative to the blank backup node may be lower than that of other backup nodes, which may cause the blank node to be unusable. Therefore, at 616, it is determined whether there is a blank backup node to solve this problem. When it is determined at 616 that there is a blank backup node, the process proceeds to 618. At 618, it is determined whether the deduplication rates are all lower than the predetermined threshold. The purpose of the determination is to assume that the deduplication rate of the source data relative to each backup node is relatively low when the deduplication rates are all lower than the predetermined threshold. Therefore, a blank backup node may be selected as the target backup node to assist in cold starting the blank backup node. When it is determined at 618 that the deduplication rates are all lower than the predetermined threshold, the process proceeds to 620. At 620, a blank backup node is selected as the target backup node. When it is determined at 618 that not all the deduplication rates are lower than the predetermined threshold, the process proceeds to 622. At 622, the backup node with the highest deduplication rate is selected, and at the same time, the backup node needs to have enough remaining space to back up the source data. Finally, the source data is backed up to the selected target backup node at 624.

Figure 7:
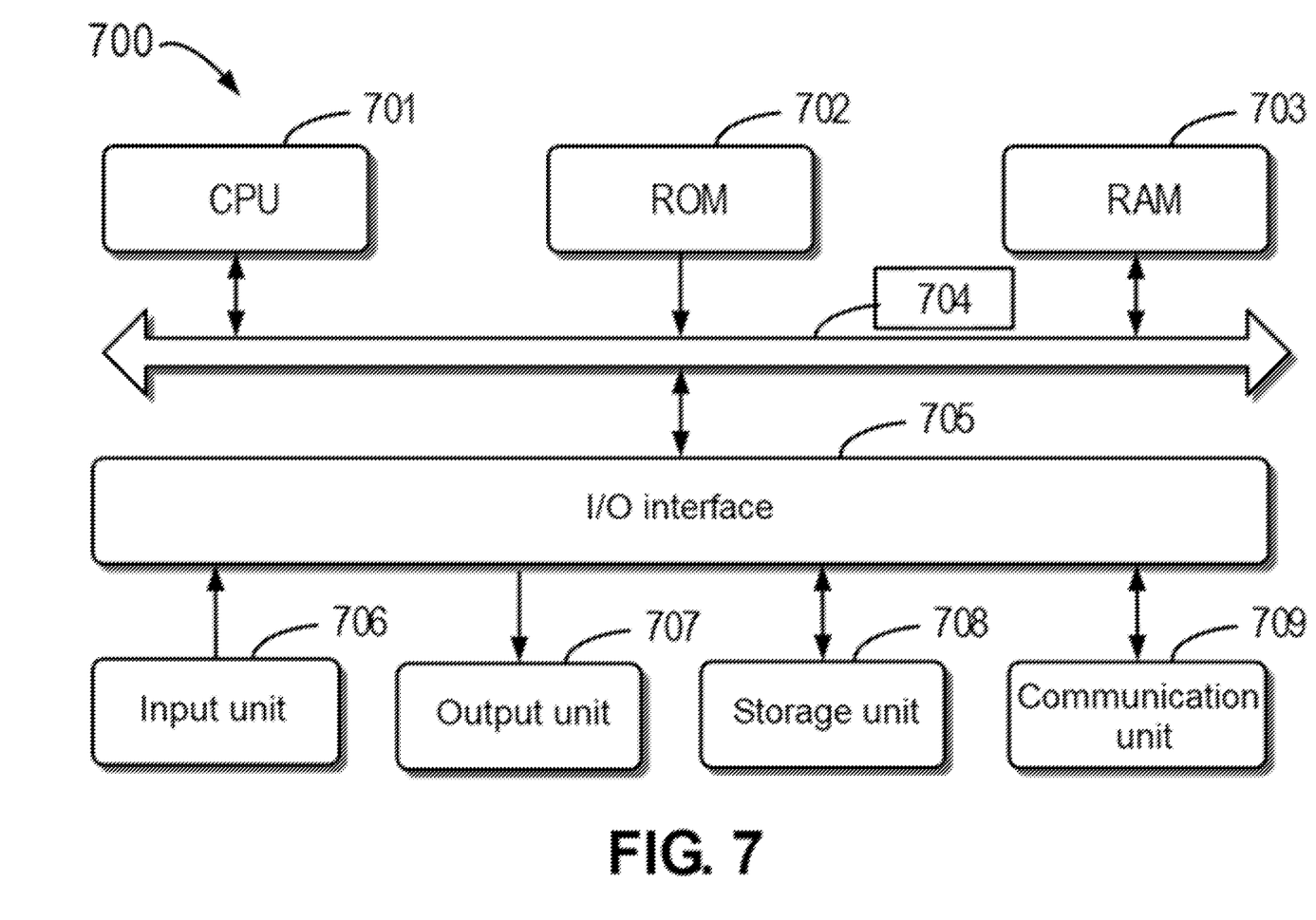
FIG. 7 is a schematic block diagram of a device that may be used to implement an embodiment of the present disclosure.

FIG. 7 is a schematic block diagram of a device 700 that may be used to implement an embodiment of the present disclosure. The device 600 may be the device or apparatus described in the embodiments of the present disclosure. As shown in FIG. 7, the device 700 includes a central processing unit (CPU) 701 that may perform various appropriate actions and processing according to computer program instructions stored in a read-only memory (ROM) 702 or computer program instructions loaded from a storage unit 708 to a random access memory (RAM) 703. Various programs and data required for the operation of the device 700 may also be stored in the RAM 703. The CPU 701, the ROM 702, and the RAM 703 are connected to each other through a bus 704. An Input/Output (I/O) interface 705 is also connected to the bus 704. Although not shown in FIG. 6, the device 700 may also include a co-processor.

A plurality of components in the device 700 are connected to the I/O interface 705, including: an input unit 706, such as a keyboard and a mouse; an output unit 707, such as various types of displays and speakers; a storage unit 708, such as a magnetic disk and an optical disc; and a communication unit 709, such as a network card, a modem, and a wireless communication transceiver. The communication unit 709 allows the device 700 to exchange information/data with other devices via a computer network, such as the Internet, and/or various telecommunication networks.

The various methods or processes described above may be performed by the processing unit 701. For example, in some embodiments, the method may be implemented as a computer software program that is tangibly included in a non-transitory machine-readable storage medium, such as the storage unit 708. In some embodiments, part or all of the computer programs may be loaded and/or installed onto the device 700 via the ROM 702 and/or the communication unit 709. When the computer program is loaded into the RAM 703 and executed by the CPU 701, one or more steps or actions of the methods or processes described above may be performed.

In some embodiments, the methods and processes described above may be implemented as a computer program product. The computer program product may include a non-transitory computer-readable storage medium on which computer-readable program instructions for performing various embodiments of the present disclosure are loaded.

The non-transitory computer-readable storage medium may be a tangible device that may retain and store instructions used by an instruction-executing device. For example, the non-transitory computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the non-transitory computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The non-transitory computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a non-transitory computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a non-transitory computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various embodiments of the present disclosure.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flow charts and/or block diagrams. The computer-readable program instructions may also be stored in a non-transitory computer-readable storage medium. These instructions cause a computer, a programmable data processing apparatus, and/or another device to operate in a particular manner, such that the non-transitory computer-readable storage medium storing the instructions includes an article of manufacture which includes instructions for implementing various embodiments of the functions/actions specified in one or more blocks in the flow charts and/or block diagrams.

The computer-readable program instructions may also be loaded onto a computer, another programmable data processing apparatus, or another device, such that a series of operation steps are performed on the computer, another programmable data processing apparatus, or another device to produce a computer-implemented process. Thus, the instructions executed on the computer, another programmable data processing apparatus, or another device implement the functions/actions specified in one or more blocks in the flowcharts and/or block diagrams.

The flow charts and block diagrams in the accompanying drawings show the architectures, functions, and operations of possible implementations of the device, the method, and the computer program product according to a plurality of embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, the functions denoted in the blocks may also occur in a sequence different from that shown in the figures. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented by a dedicated hardware-based system executing specified functions or actions, or by a combination of dedicated hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other persons of ordinary skill in the art to understand the embodiments disclosed here.

What is claimed is:

1. A method for backing up data, comprising:
    acquiring, by a system comprising a processor, data block deduplication information of source data and pieces of backup node deduplication information of backup nodes in a backup node set, wherein backup node deduplication information in the pieces of backup node deduplication information comprises data block deduplication information of backed up data in a corresponding backup node;
    determining, based on the data block deduplication information of the source data and the pieces of backup node deduplication information, deduplication rates of the source data relative to the backup nodes in the backup node set, wherein a deduplication rate in the deduplication rates indicates a deduplication ratio of the source data when backing up the source data to the corresponding backup node; and
    selecting, based on the deduplication rates for the backup nodes, a target backup node for backing up the source data from the backup node set.

2. The method according to claim 1, wherein acquiring the data block deduplication information of the source data comprises:
    acquiring, by dividing the source data into data blocks, hash values of the data blocks; and
    determining, based on the hash values, the data block deduplication information of the source data.

3. The method according to claim 2, wherein determining, based on the hash values, the data block deduplication information of the source data comprises:
    determining whether a hash value in the hash values exists in a predetermined hash cache;
    increasing, in response to the determining indicating that the hash value exists in the predetermined hash cache, a count value of data blocks corresponding to the hash value; and determining the data block deduplication information of the source data based on count values of the data blocks.

4. The method according to claim 3, wherein determining the deduplication rates of the source data relative to the backup nodes in the backup node set comprises:
   determining, based on the data block deduplication information and the pieces of backup node deduplication information, hit data block sets and missed data block sets, wherein a hit data block set in the hit data block sets comprises data blocks that are present in the data block deduplication information of the source data and exist in the backup node, and a missed data block set in the missed data block sets comprises data blocks that are present in the source data and do not exist in the backup node; and
   determining the deduplication rates based on the hit data block sets and the missed data block sets.

5. The method according to claim 4, wherein determining the deduplication rates based on the hit data block sets and the missed data block sets comprises:
   determining first deduplication values in response to a determination that the data blocks in the source data exist in the hit data block sets;
   determining second deduplication values in response to a determination that the data blocks in the source data exist in the missed data block sets; and
   determining the deduplication rates based on the first deduplication values, the second deduplication values, a first size of the data blocks in the source data, and a second size of the source data.

6. The method according to claim 1, further comprising:
   removing, in response to removing the backed up data from a backup node in the backup nodes, the data block deduplication information of the backed up data, from the corresponding backup node, deduplication information in the pieces of backup node deduplication information.

7. The method according to claim 6, further comprising:
   adding, in response to adding new backup data to a backup node in the backup nodes, data block deduplication information of the new backup data, to the corresponding backup node, deduplication information in the pieces of backup node deduplication information.

8. The method according to claim 1, further comprising:
   determining, before acquiring the data block deduplication information of the source data and the pieces of backup node deduplication information of the backup nodes in the backup node set, a change rate of the data block deduplication information of the source data in response to a determination that the source data has been previously backed up to a specific backup node in the backup node set; and
   acquiring, in response to a determination that the change rate is greater than a first predetermined threshold, the data block deduplication information of the source data and the pieces of backup node deduplication information of the backup nodes in the backup node set.

9. The method according to claim 8, further comprising:
   determining, before acquiring the data block deduplication information of the source data and the pieces of backup node deduplication information of the backup nodes in the backup node set, whether the backup nodes in the backup node set have backed up data; and
   acquiring, in response to the determining indicating that the backup nodes in the backup node set have backed up data, the data block deduplication information of the source data and the pieces of backup node deduplication information of the backup nodes in the backup node set.

10. The method according to claim 9, further comprising:
    determining, in response to a determination that the backup node set comprises a blank backup node, the target backup node for backing up the source data based on the deduplication rates.

11. The method according to claim 10, wherein determining the target backup node based on the deduplication rates comprises:
    determining, in response to a determination that each deduplication rate of the deduplication rates is less than a second predetermined threshold, the blank backup node as the target backup node for backing up the source data.

12. A device, including:
    a processor; and
    a memory coupled with the processor, wherein the memory has instructions stored therein, and the instructions, when executed by the processor, cause the device to perform actions comprising:
        acquiring data block deduplication information of source data and a group of pieces of backup node deduplication information of a group of backup nodes in a backup node set, wherein backup node deduplication information in the group of pieces of backup node deduplication information comprises data block deduplication information of backed up data in a corresponding backup node;
        determining, based on the data block deduplication information of the source data and the group of pieces of backup node deduplication information, a group of deduplication rates of the source data relative to the group of backup nodes in the backup node set, wherein a deduplication rate in the group of deduplication rates indicates a deduplication ratio of the source data when backing up the source data to the corresponding backup node; and
        selecting, based on the group of deduplication rates for the group of backup nodes, a target backup node for backing up the source data from the backup node set.

13. The device according to claim 12, wherein acquiring the data block deduplication information of the source data comprises:
    acquiring, by dividing the source data into a group of data blocks, a group of hash values of the group of data blocks; and
    determining, based on the group of hash values, the data block deduplication information of the source data.

14. The device according to claim 13, wherein determining, based on the group of hash values, the data block deduplication information of the source data comprises:
    determining whether a hash value in the group of hash values exists in a predetermined hash cache;
    increasing, in response to the determining indicating that the hash value exists in the predetermined hash cache, a count value of data blocks corresponding to the hash value; and
    determining the data block deduplication information of the source data based on a group of count values of the group of data blocks.

15. The device according to claim 14, wherein determining the group of deduplication rates of the source data relative to the group of backup nodes in the backup node set comprises:

determining, based on the data block deduplication information and the group of pieces of backup node deduplication information, a group of hit data block sets and a group of missed data block sets, wherein a hit data block set in the group of hit data block sets comprises data blocks that are present in the data block deduplication information of the source data and exist in the backup node, and a missed data block set in the group of missed data block sets comprises data blocks that are present in the source data and do not exist in the backup node; and determining the group of deduplication rates based on the group of hit data block sets and the group of missed data block sets.

16. The device according to claim 15, wherein determining the group of deduplication rates based on the group of hit data block sets and the group of missed data block sets comprises:

determining a group of first deduplication values in response to a determination that the data blocks in the source data exist in the group of hit data block sets;

determining a group of second deduplication values in response to a determination that the data blocks in the source data exist in the group of missed data block sets; and determining the group of deduplication rates based on the group of first deduplication values, the group of second deduplication values, a first size of the data blocks in the source data, and a second size of the source data.

17. The device according to claim 12, wherein the actions further comprise:

removing, in response to removing the backed up data from a backup node in the group of backup nodes, the data block deduplication information of the backed up data, from the corresponding backup node, deduplication information in the group of pieces of backup node deduplication information.

18. The device according to claim 17, wherein the actions further comprise:

adding, in response to adding new backup data to a backup node in the group of backup nodes, data block deduplication information of the new backup data, to the corresponding backup node, deduplication information in the group of pieces of backup node deduplication information.

19. A computer program product, wherein the computer program product is stored on a non-transitory computer-readable storage medium and comprises machine executable instructions, and the machine executable instructions, when executed, cause a machine to perform operations, comprising:

acquiring data block deduplication information of source data and a plurality of pieces of backup node deduplication information of a plurality of backup nodes in a backup node set, wherein backup node deduplication information in the plurality of pieces of backup node deduplication information comprises data block deduplication information of backed up data in a corresponding backup node;

determining, based on the data block deduplication information of the source data and the plurality of pieces of backup node deduplication information, a plurality of deduplication rates of the source data relative to the plurality of backup nodes in the backup node set, wherein a deduplication rate in the plurality of deduplication rates indicates a deduplication ratio of the source data when backing up the source data to the corresponding backup node; and selecting, based on the plurality of deduplication rates for the plurality of backup nodes, a target backup node for backing up the source data from the backup node set.

20. The computer program product according to claim 19, wherein the operations further comprise:

determining, before acquiring the data block deduplication information of the source data and the group of pieces of backup node deduplication information of the plurality of backup nodes in the backup node set, a change rate of the data block deduplication information of the source data in response to a determination that the source data has been previously backed up to a specific backup node in the backup node set; and acquiring, in response to a determination that the change rate is greater than a first predetermined threshold, the data block deduplication information of the source data and the plurality of pieces of backup node deduplication information of the plurality of backup nodes in the backup node set.

* * * * *